June 24, 1930. H. T. HALLOWELL 1,768,053
HAND TRUCK
Filed Nov. 18, 1926 2 Sheets-Sheet 2
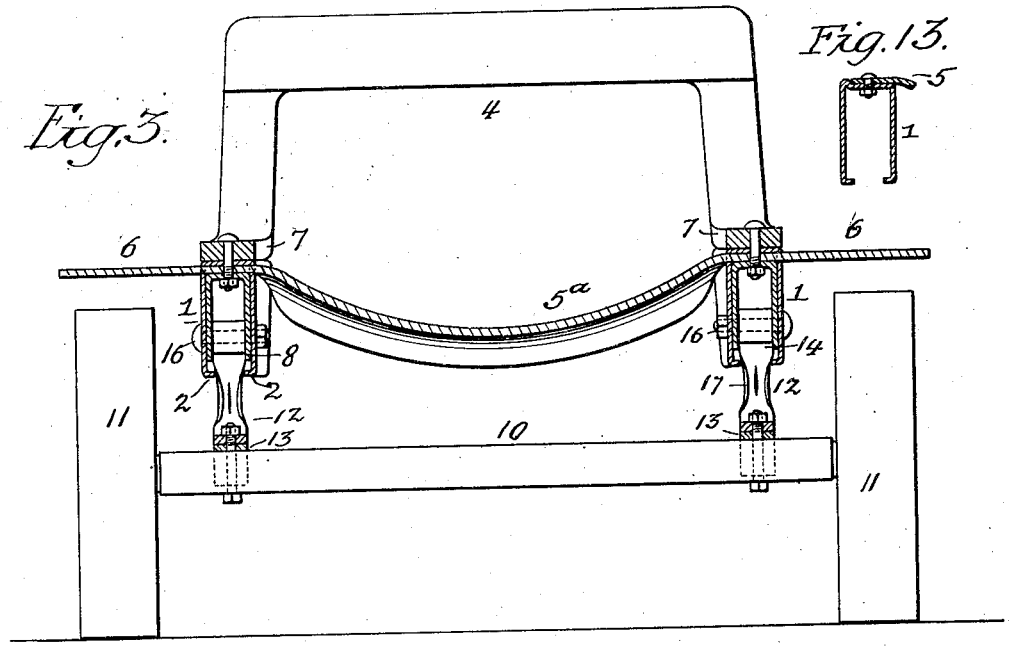
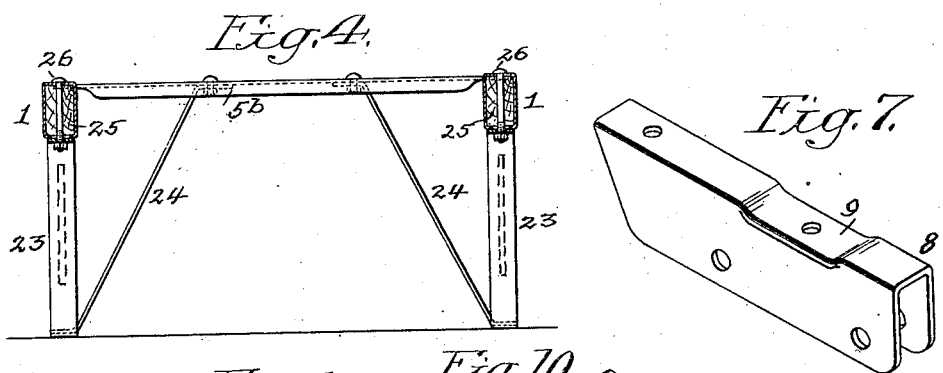
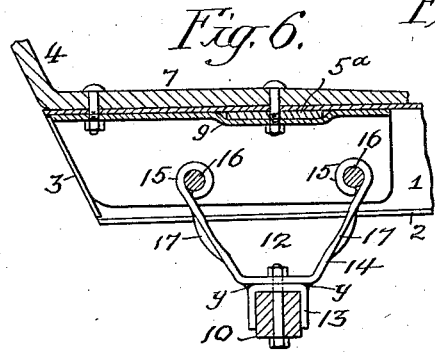
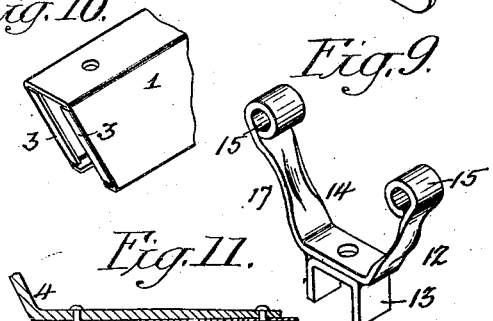
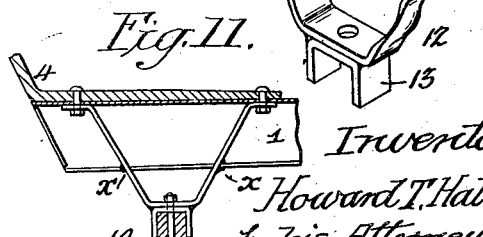
Inventor:
Howard T. Hallowell.
by his Attorneys Patented June 24, 1930

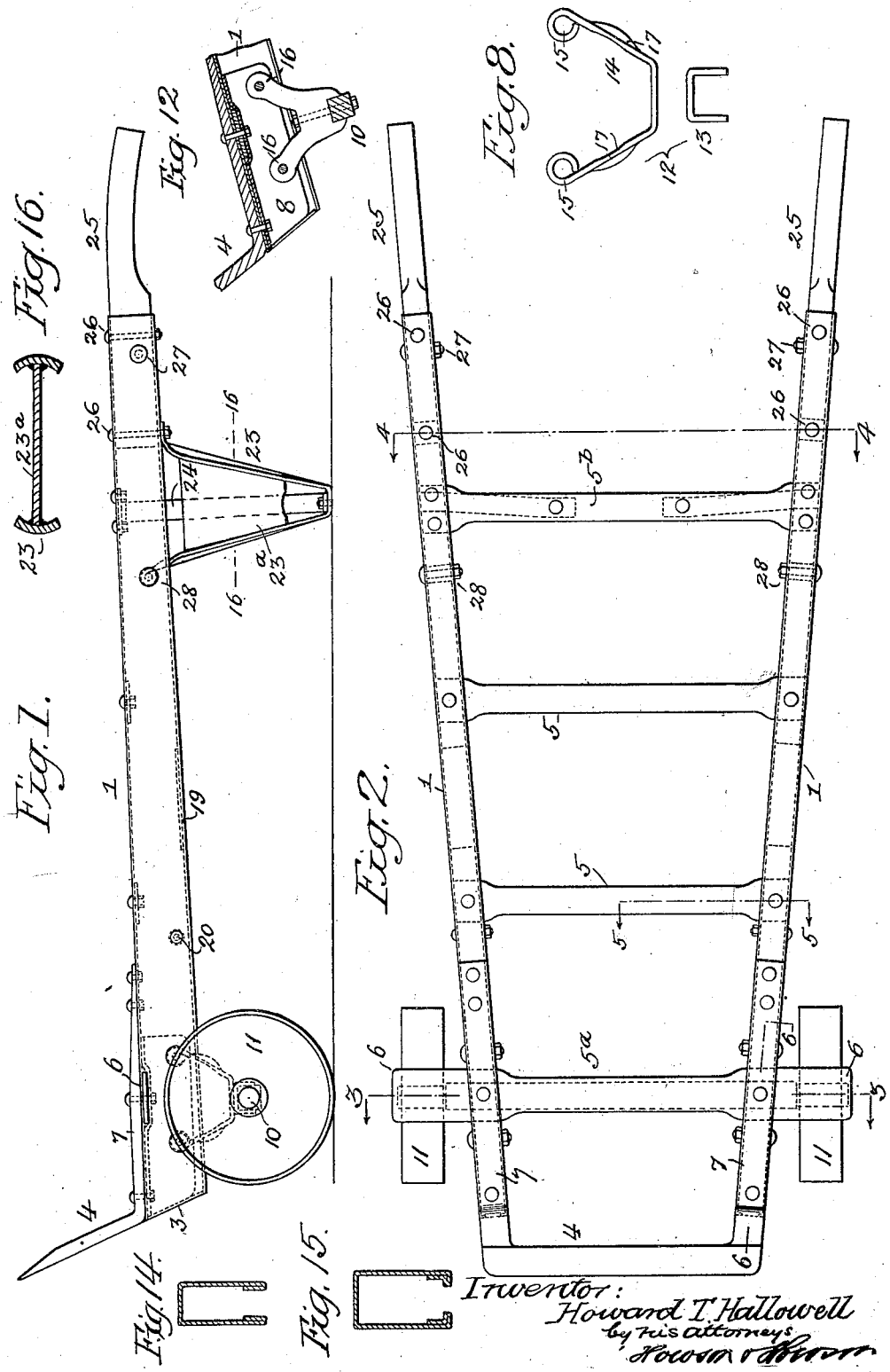

1,768,053

UNITED STATES PATENT OFFICE

HOWARD T. HALLOWELL, OF JENKINTOWN, PENNSYLVANIA, ASSIGNOR TO STANDARD PRESSED STEEL COMPANY, OF JENKINTOWN, PENNSYLVANIA, A CORPORATION OF PENNSYLVANIA

HAND TRUCK

Application filed November 18, 1926. Serial No. 149,097.

This invention relates to certain improvements in hand-trucks made of pressed steel.

The object of the invention is to so design the truck that it will be light, properly balanced and substantial, and in which the parts can be cheaply manufactured and readily assembled.

In the accompanying drawings:

Fig. 1 is a side view of my improved hand-truck;

Fig. 2 is a plan view;

Fig. 3 is a transverse sectional view on the line 3—3, Fig. 2;

Fig. 4 a sectional view on the line 4—4, Fig. 2;

Fig. 5 is a sectional view on the line 5—5, Fig. 2;

Fig. 6 is a sectional view on the line 6—6, Fig. 2;

Fig. 7 is a detached perspective view of one of the re-inforcing members;

Fig. 8 is a detached view of one of the axle brackets;

Fig. 9 is a perspective view of one of the axle brackets connected;

Fig. 10 is a view showing the flanges at the end of the side members;

Fig. 11 is a sectional view illustrating a modification of the bearings;

Fig. 12 is a view showing a cast metal bearing;

Fig. 13 is a sectional view illustrating a modification of the connection between the side frames and the bars;

Figs. 14 and 15 are views illustrating modifications of the side frames; and

Fig. 16 is a sectional view on the line 16—16, Fig. 1.

1—1 are the side members of the truck made in the form of channels, having inturned flanges 2 at their lower edges as shown clearly in Figs. 3 and 5, although the flanges may be dispensed with in some instances or made as shown in Figs. 14 and 15.

These side members are shaped from sheet metal and are tapered longitudinally as shown in Fig. 1. To reinforce the ends of said members, inturned flanges 3 are formed thereon as in Fig. 10.

The side members of the truck are connected together at the forward end by the usual nose-iron 4 and by connecting-bars 5, 5ª and 5ᵇ, arranged at intervals. The bars 5 and 5ª are shaped as shown in Figs. 3 and 5, having a slight dip in the present instance, and U-shaped in cross-section. The shaping of the bars materially strengthens the truck. The end bar 5ᵇ is straight in the present instance. The shape of the bars may be varied, depending upon the character of the material to be handled by the truck.

The bar 5ª at the forward end extends through slots in the side members and the extensions form wheel-guards 6. The other bars extend through slots in one of the inner sides of each side member, and are bolted or otherwise secured to the members as shown, although in some instances the bars may be placed on top of the side members and riveted thereto, if desired. When placed on the side members, the members are preferably depressed as shown in Fig. 13, a rib being formed on the outer edge of each side frame. The nose-piece 4 extends rearwardly past the first bar 5ª and is bolted to the side members, one of the bolts extending through the cross-bar 5ª. Particularly in heavy trucks, I preferably provide a reinforcing member 8, Fig. 7, which is U-shaped in cross-section and depressed at 9 to accommodate the cross-bar 5ª. Two of the bolts that secure the nose-piece to the side members extend through this reinforcing member.

The axle 10 is rectangular in cross-section in the present instance and has round trunnions at each end for the wheels 11. 12 are brackets for the axle. Each of these brackets has a portion 13 which fits the axle 10 and a U-shaped portion 14 having eyes 15 at the upper end. The brackets extend between the sides of the side members, and, in heavy trucks, in between the flanges of the reinforcing member 8 as clearly shown in Figs. 3 and 6. Transverse bolts 16 extend through each side member, the reinforcing member, and the eyes 15 of the brackets, firmly securing the brackets to the side members and also acting to stiffen the side members, making the front end of the truck very substantial. The brackets may be reduced in width as at 17, so as to allow the brackets to pass the inturned flanges of the side members.

In Fig. 6 the brackets are made of struck-up sheet metal which are pressed laterally to reduce the width and to form the ribs thereon, but the brackets may be made of cast metal as shown in Fig. 12, or may be made in some instances as shown in Fig. 11, where the bracket extends into the side frames and is bolted to the upper surface of the side flanges and are preferably welded at $x$—$x$ to the inturned edges of the side flanges, so as to strengthen each side frame at this point.

The reinforcing member 7 is preferably shaped to fit against the end flanges 3 of the side frames, as it will be understood that the forward end of the truck must be very substantial.

The two members 13 and 14 of the brackets are made separate. The member 13 is adjusted in respect to the member 14, so as to bring the axle in proper alignment, owing to the tapered form of the truck, and after alignment the two parts are welded together as at $y$—$y$.

The lower inturned flanges of the side members are preferably connected by webs 19, shown by dotted lines in Fig. 1, and are also connected in some instances by transverse bolts 20 which pass through spools 21, Fig. 5, made of wood or other sound-deadening material.

At the rear end of the truck are feet 23 made of pressed sheet metal and reinforced by diagonal members 24, and at the rear end of the truck are wooden handles 25, which are inserted in the open ends of the side members and are secured thereto by vertical bolts 26 and transverse bolts 27. One of the bolts 26 at each side is used to attach the foot 23 to the side member. The other portion of the foot is secured to a side member by a transverse bolt 28.

Each foot 23 is preferably made as shown in Figs. 1 and 16. The side portions of the foot are corrugated in cross-section and a web 23ª is located between the side portions and welded thereto as shown in Fig. 16. This construction can be applied to trucks subject to heavy use. In lighter trucks, the web can be dispensed with.

I claim:—

1. The combination in a hand-truck, of channel-shaped side members; a nose-piece and cross-bars connecting the side members; a bracket extending into each of the channel members near the forward end of the truck; an axle mounted in the brackets; wheels mounted on the axle; a reinforcing member inserted in each of the channel members; and means for securing the reinforcing members and brackets to the side members.

2. The combination in a hand-truck, of side members U-shape in cross-section; cross-bars connecting the side members; a nose-piece having extensions secured to the side members, the side members being slotted above the axle; a cross-bar extending through the slots and projecting over the wheels; reinforcing members located within the side members and shaped to conform to the cross-bar; brackets located in the side members and reinforcing members; transverse bolts coupling the brackets to the side members; an axle secured to the brackets; and wheels on the axle.

3. The combination in a truck, of side members U-shaped in cross section; a nose-piece and cross-bars connecting the side members; a U-shaped reinforcing piece in each side member; an axle; brackets for the axle mounted in the U-shaped side members at the reinforcing pieces; and means for securing the brackets to the side members and reinforcing pieces.

4. The combination in a hand truck, of side members; and feet at the rear of the truck, each foot having side portions with a web extending from one side portion to the other.

5. The combination in a hand truck, of side members; and feet at the rear of the truck, each foot having side portions curved in cross-section, and having a web extending from one side portion to the other and welded to said portions.

6. A bracket for a truck made in two parts integrally connected by welding, one part being a sheet metal plate struck-up to form angular portions bent at their upper ends to form eyes; and a U-shaped portion arranged to fit over an axle to which it is secured.

HOWARD T. HALLOWELL.